United States Patent [19]

Carter

[11] 3,911,044
[45] Oct. 7, 1975

[54] REMOVAL OF PROPANE FROM ALKYLATION EFFLUENT WITHOUT LOSS OF ETHYL FLUORIDE

[75] Inventor: Cecil O. Carter, Bartlesville, Okla.

[73] Assignee: Phillips Petroleum Company, Bartlesville, Okla.

[22] Filed: Oct. 19, 1973

[21] Appl. No.: 408,155

[52] U.S. Cl. .................... 260/683.48; 260/683.42
[51] Int. Cl.[2] ................................................ C07C 3/54
[58] Field of Search .................. 260/683.48, 683.42

[56] References Cited
UNITED STATES PATENTS

| 3,204,011 | 8/1965 | Hettick et al. ............... 260/683.48 |
| 3,767,726 | 10/1973 | Hutson, Jr. et al. ........... 260/683.48 |
| 3,767,727 | 10/1973 | Chapman ...................... 260/683.42 |

Primary Examiner—Delbert E. Gantz
Assistant Examiner—G. J. Crasanakis

[57] ABSTRACT

In an alkylation of an isoparaffin with an olefin in which ethyl fluoride is present in the system the isoparaffin, e.g., isobutane, upon recovery from the alkylation effluent is extracted with HF acid to remove ethyl fluoride therefrom following which the isobutane is depropanized to remove propane and lighter therefrom. The extract is stripped to recover ethyl fluoride therefrom. The ethyl fluoride is sent to the alkylation reaction. The HF is reused to extract ethyl fluoride from isobutane containing ethyl fluoride.

3 Claims, 1 Drawing Figure

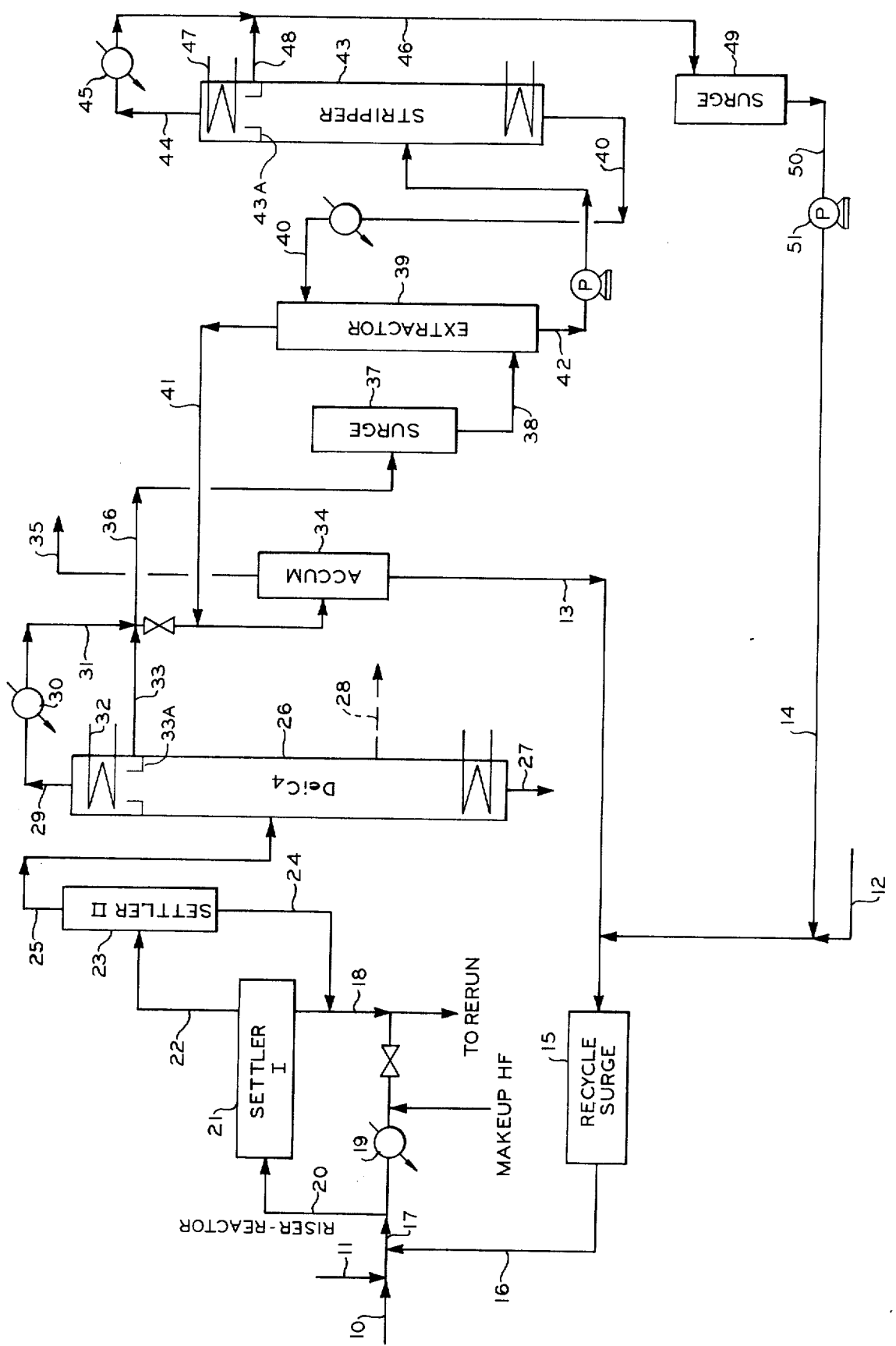

REMOVAL OF PROPANE FROM ALKYLATION EFFLUENT WITHOUT LOSS OF ETHYL FLUORIDE

This invention relates to the alkylation of an isoparaffin with an olefin. Further, it relates to the recovery of propane from such an alkylation. Still further, it relates to preventing loss of ethyl fluoride in an alkylation of an isoparaffin with an olefin in which ethyl fluoride is present in the reaction system.

In one of its concepts, the invention provides a process for the alkylation of an isoparaffin with an olefin, e.g., isobutane, with, say, propylene and/or butylenes or propylene and/or butylenes and ethylene, in the presence of HF acid catalyst having ethyl fluoride therein wherein alkylation effluent comprising alkylate, normal butane, isobutane, propane and lighter, and ethyl fluoride is fractionated to obtain a stream comprising isobutane, propane and ethyl fluoride, the stream is extracted with HF acid to remove ethyl fluoride therefrom following which propane and lighter are removed yielding isobutane which can be recycled to the alkylation system and a propane and lighter stream substantially free from ethyl fluoride, thus avoiding ethyl fluoride loss from the system. In another of its concepts, the invention provides such a process wherein the ethyl fluoride is removed from the HF extract containing the same and both the HF and ethyl fluoride are reused, the HF to extract further quantities of ethyl fluoride from the isobutane, propane and ethyl fluoride containing stream, and the ethyl fluoride being sent to the alkylation reaction.

There have been described elsewhere the alkylation of isoparaffin with ethylene in the presence of higher olefin, e.g., propylene and/or butylenes. Other isoparaffin such as isopentane and other olefins such as amylenes and hexylenes, etc. have also been included in such descriptions. The use of ethyl fluoride to modify the HF acid catalyst has been described. The recovery of ethyl fluoride, so as not to lose this valuable ingredient, has been of concern. Various schemes have been proposed for the removal of ethyl fluoride from various streams.

I have now conceived of a simple, direct operation in which the ethyl fluoride can be extracted from at least a portion, if not all, of the deisobutanizer overhead by using HF acid, this operating being effected prior to the separation of propane and lighter from the system. Thus, some or all of the deisobutanizer overhead, containing propane and lighter at least in sufficient quantity to remove whatever are undesirable quantities, that is, to remove from the system that quantity of propane (and lighter) which is charged to the alkylation system, and that quantity which may be produced in the alkylation is treated with HF acid to remove ethyl fluoride therefrom following which the isobutane is freed from the propane and lighter, without loss of valuable ethyl fluoride.

It is an object of this invention to provide an alkylation operation. It is a further object of this invention to provide an alkylation operation for the alkylation of an isoparaffin with an olefin. It is a still further object of the invention to provide such an operation in which ethyl fluoride is retained in the system while undesired quantities of propane and lighter are yielded therefrom.

Other aspects, concepts, objects, and the several advantages of this invention are apparent from a study of this disclosure, the drawing and the appended claims.

According to the present invention, in an alkylation operation, e.g., in the alkylation of an isoparaffin with an olefin in the presence of HF catalyst in which ethyl fluoride is added or generated, an isoparaffin stream containing lighter hydrocarbons and ethyl fluoride is extracted with HF acid to remove ethyl fluoride therefrom into the HF acid following which the thus treated stream is further treated to remove the lighter hydrocarbons therefrom without loss of the ethyl fluoride.

Referring now to the drawing to illustrate an embodiment of the invention, propylene and/or butylenes and ethylene are fed by 10 and 11 together with recycle isobutane and HF acid fed by 16 through 17 into riser-reactor 20 together with HF acid removed from a settler 21 by 18 and passed by cooler 19 to 20 for the alkylation reaction, as one skilled in the art in possession of this disclosure having studied the same will understand in view of his knowledge of the art. In settler 21 the HF acid catalyst liquid phase is separated from the hydrocarbon liquid phase which passes by 22 to a second settler 23 from which additional HF catalyst is removed at 24 for addition to the acid in 18.

Hydrocarbon is taken off the top of settler 23 by 25 and passed to deisobutanizer column 26 from which there are removed as bottoms 27 an alkylate product for debutanization or in the alternative the normal butane is removed as vapor at 28 while an overhead vapor 29 is taken through a condenser 30 and by 31 and 36 to a surge tank 37. From surge tank 37 the overhead stream which contains isobutane, propane and lighter and ethyl fluoride is passed by 38 to HF acid extractor 39 to which HF acid is passed by 40. In the extractor 39 ethyl fluoride is taken into the HF which is removed from extractor 39 at 42 and pumped to stripper 43. The overhead from extractor 39 passes by 41 to accumulator 34. At accumulator 34 conditions are maintained to remove therefrom vaporous propane and lighter via 35. Stream 35 is further treated for HF removal (not shown, e.g. conventional HF stripping) to yield LPG product. Isobutane as a liquid is passed from accumulator 34 by 13 together with some HF acid catalyst therein to recycle surge 15 and from there to 16 and thence to the alkylation reaction earlier described. HF acid containing ethyl fluoride is stripped in stripper 43, the acid after heat removal is returned by 40 for reuse in extractor 39 and ethyl fluoride taken overhead at 44 is cooled at 45 and passed by 46 to surge 49. From surge 49 ethyl fluoride is taken as desired by 50, pump 51, 14 and 12, together with isobutane feed and added to the recycle isobutane-acid emulsion 13 and passed to recycle surge 15 for use as already described.

If desired, internal condenser 32 and liquid trapout tray 33A with product removal 33 can be used in lieu of external cooler-condenser 30. Similarly, internal condenser 47 and liquid trapout tray 43A with product removal 48 can be used in lieu of external condenser 45.

The following is presented as representative of conditions which would obtain in an operation according to the invention. This example will be helpful to one skilled in the art to place the invention into actual operation. The information given in the example is based upon data as well as other information and knowledge which are available to applicant.

TYPICAL OPERATION

Feed Streams:

| | |
|---|---|
| (10) Propylene-Butylenes (50-50), B/H | 47 |
| (11) Ethylene, B/H | 161 |
| (12) Feed Isobutane (95%), B/H | 211 |

Product Yields:

| | |
|---|---|
| (27) Alkylate (iC$_5$ and heavier), B/H | 290 |
| (35) Feed to Depropanizer, B/H | 50 |

Recycle Streams:

| | |
|---|---|
| (13) Isobutane + HF, B/H | 2690 |
| Wt. % of HF | 5* |
| (14) Recycle C$_2$H$_5$F, B/H | 81 |
| Reactor (20) | |
| Total Isobutane/Total Olefin Mol Ratio | 10 to 1 |
| HF Catalyst/Hydrocarbon Volume Ratio | 4 to 1 |
| Residence Time, seconds | 30 |
| Temperature, °F | 90 |
| Pressure, psig | (to maintain liquid) |
| (27) Debutanized Alkylate: | |
| RON, OccTEL | 98.5 |
| (18) HF Catalyst, Wt. %: | |
| HF | 74.9 |
| H$_2$O | 0.5 |
| Acid Soluble Oils | 0.1 |
| Isobutane | 5.2 |
| C$_2$H$_5$F | 19.3 |

*Note: Solubility of HF in iC$_4$ at 100F is about 1.5 weight percent. If the ethyl fluoride was included in this stream the solubility would be about 2.5 weight percent HF. The excess represents mechanical carryover of HF acid and reduced solubility resulting from removal of both C$_3$H$_8$ and C$_2$H$_5$F.

As one skilled in the art will understand, the olefin higher or heavier than ethylene can be propylene, a butylene, an amylene or a hexylene or a mixture of these together with ethylene. The ethyl fluoride can be added as such or generated in situ. A quantity of ethylene can be added continuously or intermittently to the operation to generate the ethyl fluoride in situ.

Reasonable variation and modification are possible within the scope of the foregoing disclosure, the drawing and the appended claims to the invention the essence of which is that an isoparaffin stream, e.g., isobutane, containing propane and lighter and ethyl fluoride is first extracted with HF acid to remove the ethyl fluoride therefrom following which the propane and lighter are separated thus avoiding loss of valuable ethyl fluoride from the system while removing undesirable propane and lighter from that system.

I claim:

1. A process for the alkylation of isoparaffin with an olefin in which ethyl fluoride and propane are present in the hydrocarbon phase which comprises: (1) fractionating said hydrocarbon phase, thereby obtaining a stream consisting essentially of isoparaffin, propane, and ethyl fluoride; (2) extracting said stream with HF acid thereby removing ethyl fluoride from said stream; (3) passing said stream from which ethyl fluoride was removed to a separating zone to separate propane vapor from said stream; (4) separating propane from the separating zone; and (5) recycling isoparaffin from said separating zone and separated ethyl fluoride from step (2) to the alkylation zone.

2. A process according to claim 1 wherein the isoparaffin is isobutane and said stream containing isobutane, propane and ethyl fluoride is obtained as a deisobutanizer overhead.

3. A process according to claim 2 wherein the isoparaffin is selected from the group consisting of isobutane and isopentane and said olefin is at least one selected from the group consisting of propylene, a butylene, an amylene and a hexylene and said olefin includes ethylene.

* * * * *